(12) United States Patent
Yang (10) Patent No.: US 10,791,122 B2
(45) Date of Patent: Sep. 29, 2020

(54) BLOCKCHAIN USER ACCOUNT DATA

(71) Applicant: Alibaba Group Holding Limited, George Town (KY)

(72) Inventor: Xinying Yang, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/803,388

(22) Filed: Feb. 27, 2020

(65) Prior Publication Data

US 2020/0204560 A1    Jun. 25, 2020

Related U.S. Application Data

(63) Continuation of application No. PCT/CN2020/071840, filed on Jan. 13, 2020.

(30) Foreign Application Priority Data

Jul. 4, 2019    (CN) .......................... 2019 1 0599878

(51) Int. Cl.
*H04L 9/08* (2006.01)
*H04L 29/06* (2006.01)
(Continued)

(52) U.S. Cl.
CPC .......... *H04L 63/102* (2013.01); *G06F 16/325* (2019.01); *H04L 9/006* (2013.01);
(Continued)

(58) Field of Classification Search
CPC ..... H04L 63/062; H04L 63/102; H04L 9/006; H04L 9/0825
See application file for complete search history.

(56) References Cited

U.S. PATENT DOCUMENTS

| 2017/0180128 A1 | 6/2017 | Lu |
| 2018/0083771 A1 | 3/2018 | Bonnell |

(Continued)

FOREIGN PATENT DOCUMENTS

| CN | 106411901 | 2/2017 |
| CN | 106934605 | 7/2017 |

(Continued)

OTHER PUBLICATIONS

Friebe et al. DecentID: Decentralized and Privacy-preserving Identity Storage System using Smart Contracts 2018 17th IEEE International Conference on Trust, Security and Privacy in Computing and Communications (Year: 2018).*

(Continued)

*Primary Examiner* — David J Pearson
(74) *Attorney, Agent, or Firm* — Fish & Richardson P.C.

(57) ABSTRACT

A computer-implemented method for storing data of a new user account in a blockchain ledger, the method including: receiving, from a first client, by a server storing data in the blockchain ledger, an operation instruction instructing the server to create a user account corresponding to a user identifier, in which the operation instruction includes the user identifier and a public key parameter; obtaining, based on the public key parameter, a public key corresponding to the user identifier; creating, in the blockchain ledger, the user account corresponding to the user identifier; generating a data record including the operation instruction and the public key; and writing the data record into the blockchain ledger.

15 Claims, 3 Drawing Sheets

(51) Int. Cl.
*H04L 9/06* (2006.01)
*H04L 9/30* (2006.01)
*G06F 16/31* (2019.01)
*H04L 9/32* (2006.01)
*H04L 9/00* (2006.01)

(52) U.S. Cl.
CPC .......... *H04L 9/0643* (2013.01); *H04L 9/0825* (2013.01); *H04L 9/3073* (2013.01); *H04L 9/3263* (2013.01); *H04L 2209/38* (2013.01)

(56) References Cited

U.S. PATENT DOCUMENTS

| | | | |
|---|---|---|---|
| 2018/0219677 A1 | 8/2018 | Nair et al. | |
| 2019/0034465 A1* | 1/2019 | Shimamura | G06F 16/2474 |
| 2019/0140848 A1* | 5/2019 | Dontov | H04L 63/0823 |
| 2019/0229930 A1* | 7/2019 | Haque | H04L 67/12 |
| 2020/0005282 A1* | 1/2020 | Kim | H04L 9/3239 |
| 2020/0007346 A1* | 1/2020 | Callan | H04L 9/0643 |
| 2020/0067907 A1* | 2/2020 | Avetisov | G06F 16/9014 |

FOREIGN PATENT DOCUMENTS

| | | |
|---|---|---|
| CN | 107070644 | 8/2017 |
| CN | 107977163 | 5/2018 |
| CN | 108599954 | 9/2018 |
| CN | 108876593 | 11/2018 |
| CN | 109067801 | 12/2018 |
| CN | 109255619 | 1/2019 |
| CN | 109347632 | 2/2019 |
| CN | 109902086 | 6/2019 |
| CN | 110474775 | 11/2019 |

OTHER PUBLICATIONS

Won et al. Decentralized Public Key Infrastructure for Internet-of-Things Milcom 2018 Track 5—Big Data and Machine Learning (Year: 2018).*
Lee et al. BIDaaS: Blockchain Based ID as a Service IEEE Digital Object Identifier 10.1109/ACCESS.2017.2782733 (Year: 2017).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/071840, dated Apr. 3, 2020, 19 pages (with machine translation).

* cited by examiner

BLOCKCHAIN USER ACCOUNT DATA

CROSS-REFERENCE TO RELATED APPLICATIONS

This application is a continuation of PCT Application No. PCT/CN2020/071840, filed on Jan. 13, 2020, which claims priority to Chinese Patent Application No. 201910599878.4, filed on Jul. 4, 2019, and each application is hereby incorporated by reference in its entirety.

TECHNICAL FIELD

Implementations of the present specification relate to the field of information technologies, and in particular, to user account creation methods and apparatuses in a blockchain-type ledger that stores data based on a blockchain data structure (e.g., in a form of a blockchain) and devices.

BACKGROUND

When a database server provides a service externally by using a blockchain-type ledger in a centralized method, a data record in the ledger usually needs a digital signature encrypted by each party by using a private key. Therefore, a user often needs to decrypt, by using a corresponding public key, this type of data encrypted by the private key.

SUMMARY

Implementations of the present application aim to provide user account creation solutions used to reduce user operations in a blockchain-type ledger and ensure accuracy of a public key.

To alleviate the previous technical problem, the implementations of the present application are implemented as follows:

A user account creation method in a blockchain-type ledger is provided and is applied to a database server that stores a data record by using a blockchain-type ledger. The method includes: receiving an operation instruction sent by a client to create a user account, where the operation instruction includes a user identifier and a public key parameter; obtaining a public key corresponding to the user identifier; executing the operation instruction to create a user account corresponding to the user identifier in the blockchain-type ledger; and generating a data record including the operation instruction and the public key, and writing the data record into the blockchain-type ledger.

Correspondingly, an implementation of the present specification further provides a user account creation apparatus in a blockchain-type ledger, and the apparatus is applied to a database server that stores a data record by using a blockchain-type ledger, and includes: a receiving module, configured to receive an operation instruction sent by a client to create a user account, where the operation instruction includes a user identifier and a public key parameter; an obtaining module, configured to obtain a public key corresponding to the user identifier; an execution module, configured to execute the operation instruction to create a user account corresponding to the user identifier in the blockchain-type ledger; and a first writing module, configured to: generate a data record including the operation instruction and the public key, and write the data record into the blockchain-type ledger.

In the solutions provided in the implementations of the present specification, when a user account with certain permission needs to be created in a ledger, a public key of the user is obtained, and the operation instruction for creating a user account and the public key are written into the blockchain-type ledger in a form of the data record, so that the public key is attested in the ledger and cannot be tampered with, and corresponding public key can be used for corresponding digital signature decryption verification in the future.

It should be understood that the previous general description and the following detailed description are merely examples and explanations, and are not intended to limit the implementations of the present specification.

In addition, any of the implementations in the present specification implementation does not need to achieve all the previous effects.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

Figure 1:
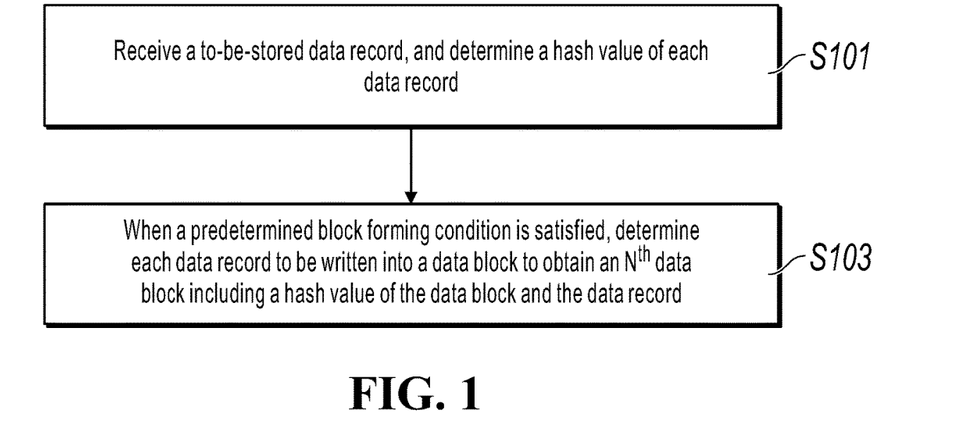
FIG. 1 is a schematic diagram illustrating a procedure of generating a blockchain-type ledger, according to an implementation of the present specification.

A centralized blockchain-type ledger in the implementations of the present specification is first described. At a centralized database service provider, a blockchain-type ledger is generated in the following method. As shown in FIG. 1, FIG. 1 is a schematic diagram illustrating a procedure of generating a blockchain-type ledger, according to an implementation of the present specification. The procedure includes the following steps.

S101. Receive a to-be-stored data record, and determine a hash value of each data record.

The to-be-stored data record here can be various expense records of an individual user of a client, or can be a service result, an intermediate state, an operation record, etc. that is generated by an application server when the application server executes service logic based on an instruction of a user. Specific service scenarios can include an expense record, an audit log, a supply chain, a government supervision record, a medical record, etc.

S103. When a predetermined block forming condition is satisfied, determine each data record to be written into a data block to generate an $N^{th}$ data block including a hash value of the data block and the data record.

The predetermined block forming condition includes: a quantity of to-be-stored data records reaches a quantity threshold. For example, a new data block is generated each time one thousand data records are received, and the one thousand data records are written into the block. Alternatively, a time interval from a previous block forming moment reaches a time threshold. For example, a new data block is generated every five minutes, and data records received in the five minutes are written into the block.

N here is a sequence number of a data block. In other words, in some implementations of the present specification, data blocks are arranged in a form of a blockchain and in a sequence of block forming times, and have a strong time sequence feature. A block height of the data block is monotonously increased in the sequence of block forming times. The block height can be a sequence number, and in this case, a block height of the $N^{th}$ data block is N. The block height can be generated in another method. For example, the block forming time of the data block is converted into a monotonously increasing large integer through symmetric encryption, and the integer is used as the block height.

When N=1, that is, the data block in this case is an initial data block, a hash value and a block height of the initial data block are given based on a predetermined method. For example, if the initial data block includes no data record, the hash value is any given hash value, and the block height blknum=0. For another example, a trigger condition for generating the initial data block is consistent with a trigger condition for another data block, but the hash value of the initial data block is determined by performing hashing on all content in the initial data block.

When N>1, because content and a hash value of a previous data block (namely, an $(N-1)^{th}$ data block) are determined, a hash value of a current data block (the $N^{th}$ data block) can be generated based on the hash value of the previous data block. For example, in a feasible method, a hash value of each data record to be written into the $N^{th}$ data block is determined, a Merkle tree is generated in an arrangement order of the data records in the block, a root hash value of the Merkel tree is connected with the hash value of the previous data block, and the hash value of the current block is generated by using a hash algorithm again. For another example, data records in a block can be connected in a sequence of the data records, and a hash value of an overall data record is obtained by performing hashing on the data records, the hash value of the previous data block is connected with the hash value of the overall data record, and a hash operation is performed on a string obtained through connection to generate the hash value of the data block.

After successfully uploading data, a user can obtain and store a hash value of a corresponding data record and a hash value of a data block where the data record is located, and can initiate integrity verification based on the hash value. A specific verification method is as follows: The hash value of the data record and the hash value of the data block where the data record is located are recalculated in a database, and the hash values are compared with the locally stored hash values.

In the previous data block generation method, each data block is determined by using a hash value, and the hash value of the data block is determined by content and a sequence of data records in the data block and a hash value of a previous data block. The user can initiate verification at any time based on the hash value of the data block. Modification to any content in the data block (including modification to the content or the sequence of the data records in the data block) causes inconsistency between a hash value of the data block calculated during verification and a hash value calculated during generation of the data block, leading to a verification failure. As such, the hash value cannot be tampered in a centralized case.

When a blockchain-type ledger is verified, continuous integrity verification is usually performed on a specified segment of data blocks, or continuous integrity verification is performed from an initial data block. A verification method is as follows: A hash value of a previous data block is obtained, and a hash value of the data block is recalculated based on a data record in the data block and the hash value of the previous data block by using an algorithm the same with that used when a hash value of the data block is generated, and the hash value of the data block is compared with the previous hash value.

The blockchain-type ledger in the implementations of the present specification is described above. In practice, a user can create a corresponding ledger in a database server, and write a data record related to the user into the ledger. For example, in an application scenario, the user can perform, by using a client, asset-related behaviors with a service provider, for example, purchasing/selling funds or insurances. As a result, corresponding asset change records are generated. In this case, the user can actively write the corresponding asset change records into the ledger for storage.

In addition, the service provider usually generates delivery lists, reconciliation lists, etc. related to the user, and some services that do not need to be actively operated by the user, such as interest and dividend calculation. In this case, the user also needs the service provider to write this data record into the ledger of the user for attestation.

Figure 2:
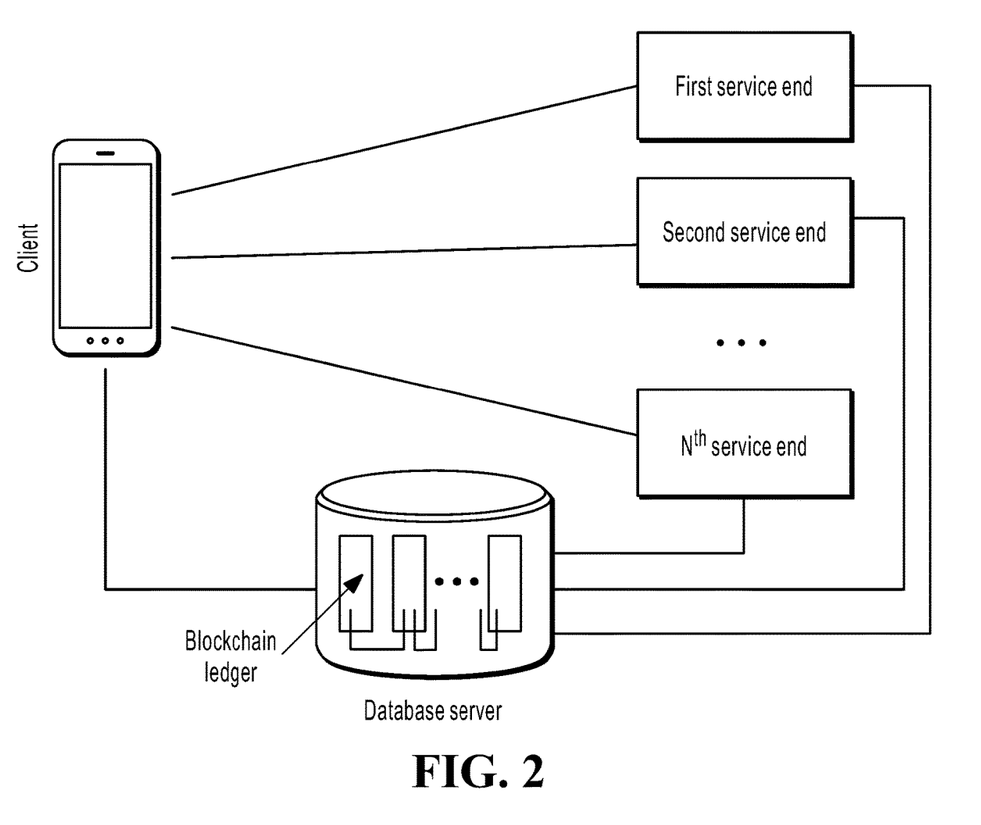
FIG. 2 is a schematic diagram illustrating a system architecture, according to an implementation of the present specification.

In this case, the user needs to create another corresponding user account in the ledger by using the client, so that the service provider can write corresponding data into the ledger. As shown in FIG. 2, FIG. 2 is a schematic diagram illustrating a system architecture, according to an implementation of the present specification. The client can have service transactions with a plurality of service ends. In this case, a user account may need to be created in the ledger for each service end, so that the service end separately writes related data into the ledger.

Figure 3:
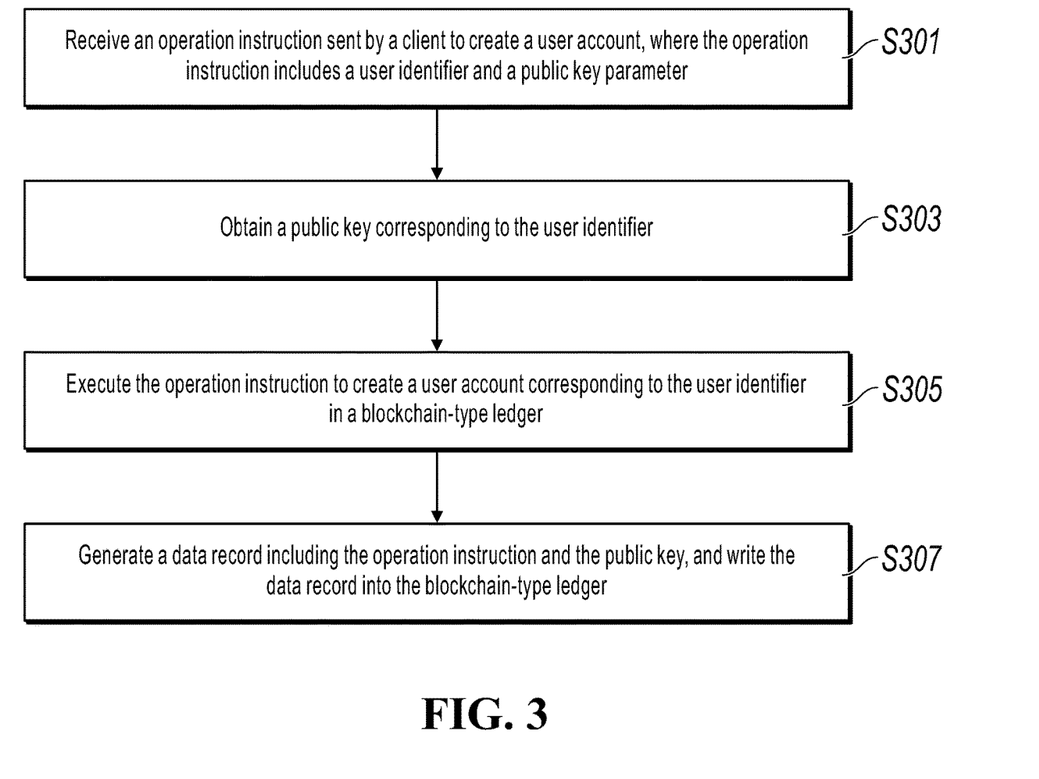
FIG. 3 is a schematic flowchart illustrating a user account creation method in a blockchain-type ledger, according to an implementation of the present specification.

Based on this, an implementation of the present specification further provides a user account creation method in a blockchain-type ledger, and the method is applied to a database server that stores a data record by using a blockchain-type ledger. As shown in FIG. 3, FIG. 3 is a schematic flowchart illustrating a user account creation method in a blockchain-type ledger, according to an implementation of the present specification. The method includes the following steps.

S301. Receive an operation instruction sent by a client to create a user account, where the operation instruction includes a user identifier and a public key parameter.

Specifically, the operation instruction for creating a user account by the user can be in the following form: CreatRole (userid, pub_key), indicating that the user needs to create a corresponding user account whose user name is "userid" in a ledger of the user, and indicates, by using the parameter "pub_key", that a public key of the user is needed.

In an implementation, a permission parameter can be further directly added to CreatRole, for example, CreatRole (userid, pub_key, 20), indicating that an operation permission of the created user account is 20. Certainly, the user can be assigned a permission value by using another instruction after the user account is created.

S303. Obtain a public key corresponding to the user identifier.

In an actual application scenario, the user identifier usually corresponds to some service institutions. These institutions usually have public keys, such as public keys authenticated by the Certificate Authority (CA). A CA center can issue a digital certificate to each user who uses the public key, and a function of the digital certificate is to prove that the user listed in the certificate legally owns the public key listed in the certificate.

In other words, the server can obtain the public key corresponding to the user identifier through query based on the user identifier. For example, the server queries the CA center to obtain the public key; or the server pre-stores a public key and a user identifier of each service institution to locally establish a public key information table, and obtains the public key corresponding to the user identifier from the public key information table.

In another implementation, if an institution corresponding to the user identifier does not have a public key authenticated in public, the database server can invoke a corresponding key generation algorithm to generate a public-private key pair. In addition, the database server sends a private key in the public-private key pair to a service end corresponding to the user identifier, and obtains the public key in the public-private key pair. A specific key generation algorithm can be an RSA encryption algorithm.

S305. Execute the operation instruction to create a user account corresponding to the user identifier in the blockchain-type ledger.

After the operation instruction is executed successfully, the user identifier is used as a user name to create a user account with a certain operation permission in the ledger. Further, user account creation success information can be sent to the client, or the user name is sent to the institution corresponding to the user identifier, so that the institution can operate the ledger by using the user name.

S307. Generate a data record including the operation instruction and the public key, and write the data record into the blockchain-type ledger.

After executing the operation instruction and successfully creating the user account, the database server further needs to write the operation instruction and the public key into the ledger. Specifically, the database server generates a data record including the operation instruction and the public key, for example, the database server directly connects a character string corresponding to the operation instruction and the public key (the public key is also a character string) to obtain a data record, and writes the data record into a data block in the blockchain-type ledger. A specific method for writing the data record into the data block is described above, and details are omitted here for simplicity.

In the solution provided in the this implementation of the present specification, when a user account with certain permission needs to be created in the ledger, the public key of the user is obtained, and the operation instruction for creating a user account and the public key are written into the blockchain-type ledger in a form of the data record, so that the public key is attested in the ledger and cannot be tampered with, and corresponding public key can be used for corresponding digital signature decryption verification in the future.

In an implementation, the database server can further store a user configuration file for the ledger. The user configuration file can store an available user name, an operation permission of each user, and corresponding public key information in the ledger. Table 1 shows a form of an example user configuration file provided in this implementation of the present specification. The key1 and key2 in the table respectively represent public key information of the users ROLE01 and the ROLE02.

TABLE 1

| User configuration file | | |
| --- | --- | --- |
| User name | Weight value | Public_Key |
| SYSADM | 100 | |
| ROLE01 | 50 | Key1 |
| ROLE02 | 25 | Key2 |

The public key information is stored in the user configuration file of the ledger, so that the database server can conveniently perform corresponding management on each user account in the ledger, and can conveniently obtain a public key of the user, thereby decrypting data having a digital signature by using the public key.

In an implementation, after the operation instruction is executed and the operation instruction and the public key information are written into the ledger in a form of the data record, the database server can further create indexes of data records including user account creation information to be verified at any time in the future.

Specifically, because a time for creating another user account in the ledger is random, data records including the user account creation information are also distributed in the ledger, which is inconvenient if the information is queried in the future. If there is no index, the information needs to be queried by traversing the ledger. Based on this, a public key index table related to the user identifier, the public key, and position information in the data record can be created based on the position information of the data record.

In some implementations of the present specification, one blockchain-type ledger includes a plurality of data blocks, and one data block usually includes a plurality of data records. Therefore, in some implementations of the present specification, the position information specifically indicates a data block in the ledger that a data record is located at and an offset of the data record in the data block.

In the data block provided in some implementations of the present specification, a plurality of methods can be used to identify different data blocks, including a hash value or a block height of the data block.

The hash value of the data block is a hash value obtained by performing hashing calculation based on a hash value of a previous block and a data record in the data block, and can be used to uniquely and explicitly identify a data block. In the blockchain-type ledger, a block height of the first data block is usually 0, and the block height is increased by 1 each time one data block is added subsequently. Alternatively, a block forming time of the data block can be converted into a large integer data sequence (which usually includes 12 to 15 bits) monotonously increased, and the large integer data sequence is used as the block height of the data block. Therefore, a data block usually has an explicit block height.

For another example, in a determined data block that needs to be written into a database, a sequence of data records in the data block is also fixed. Therefore, a sequence number of a data record in the data block is also explicit. When a length of the data record is a fixed unit, the sequence number can also be used to determine position information of the data record in the data block where the data record is located. To be specific, the sequence number can also be used to indicate the offset.

In addition, because one data block usually includes a plurality of data records, address offsets of the data records in the data block can be used to separately identify the data records in the data block. Clearly, the address offsets of the data records are different in the same data block.

Certainly, in the method provided in some implementations of the present specification, a specific format of the data block can be customized (for example, metadata information and comment information included in a block header of the data block, and a form of block height of the data block). In different formats, content of the position information can be different, which does not constitute a limitation on this solution.

Table 2 shows an example public key index table provided in some implementations of the present specification. The public key (Pub_Key) is a primary key, and corresponds to the position (position information) and Userid (user name). Each array of the position part is one piece of position information, the previous part of the array is a block height, and a later part is a sequence number of the data record in the data block. A data record can be uniquely determined by using the block height and the sequence number.

TABLE 2

| Pub_Key | Position | Userid |
|---------|----------|--------|
| Key1    | (2, 08)  | ID1    |
| Key2    | (5, 01)  | ID2    |
| ...     | ...      | ...    |

Further, after the index is created, the client can query the public key information of the user based on the user identifier at any time. Specifically, the client queries the public key index table based on the user identifier to obtain the public key of the user, or queries the public key index table to obtain the position information corresponding to the user identifier, queries the blockchain-type ledger to obtain the data record corresponding to the position information from, and obtains the public key included in the data record. Because the blockchain-type ledger ensures that the data record is not tampered with, the public key obtained from the data record can ensure accuracy of the public key.

Figure 4:
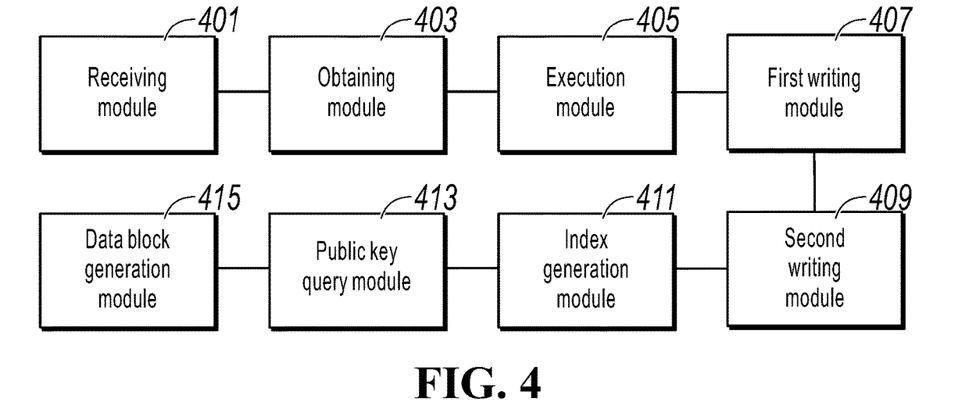
FIG. 4 is a schematic structural diagram illustrating a user account creation apparatus, according to an implementation of the present specification.

Correspondingly, an implementation of the present specification further provides a user account creation apparatus in a blockchain-type ledger, and the apparatus is applied to a database server that stores a data record by using a blockchain-type ledger. As shown in FIG. 4, FIG. 4 is a schematic structural diagram illustrating a user account creation apparatus, according to an implementation of the present specification. The apparatus includes: a receiving module 401, configured to receive an operation instruction sent by a client to create a user account, where the operation instruction includes a user identifier and a public key parameter; an obtaining module 403, configured to obtain a public key corresponding to the user identifier; an execution module 405, configured to execute the operation instruction to create a user account corresponding to the user identifier in the blockchain-type ledger; and a first writing module 407, configured to: generate a data record including the operation instruction and the public key, and write the data record into the blockchain-type ledger.

Further, the obtaining module 403 is configured to: obtain the public key corresponding to the user identifier from a pre-stored public key information table; and invoke a key generation algorithm to generate a public-private key pair corresponding to the user identifier, and obtain a public key in the public-private key pair.

Further, the apparatus includes a second writing module 409, configured to: establish a mapping relationship between the user identifier and the public key, and write the mapping relationship into a user configuration file corresponding to the blockchain-type ledger.

Further, the apparatus includes an index generation module 411, configured to: determine position information of the data record including the operation instruction and the public key in the blockchain-type ledger, where the position information includes a block height of a data block where the data record is located and an offset of the data record in the data block where the data record is located; and establish a mapping relationship between the user identifier, the public key, and the position information, and write the mapping relationship into a public key index table.

Further, the apparatus includes a public key query module 413, configured to: receive a request that is sent by the client and for obtaining a public key, where the request includes the user identifier; and query the public key index table to obtain the public key corresponding to the user identifier; or query the public key index table to obtain the position information corresponding to the user identifier, query the blockchain-type ledger to obtain the data record corresponding to the position information, and obtain the public key included in the data record.

Further, the apparatus includes a data block generation module 415, configured to: receive a to-be-stored data record, and determine a hash value of each data record; and when a predetermined block forming condition is satisfied, determining each data record to be written into data block to generate an $N^{th}$ data block including a hash value of the data block and the data record specifically includes the following: When N=1, a hash value and a block height of an initial data block are given based on a predetermined method; and when N>1, a hash value of the $N^{th}$ data block is determined based on each data record to be written into the data block and a hash value of an $(N-11)^{th}$ data block, to generate the $N^{th}$ data block including the hash value of the $N^{th}$ data block and each data record.

An implementation of the present specification further provides a computer device. The computer device includes at least a memory, a processor, and a computer program that is stored in the memory and that can run on the processor. When executing the program, the processor performs the user account creation method shown in FIG. 3.

Figure 5:
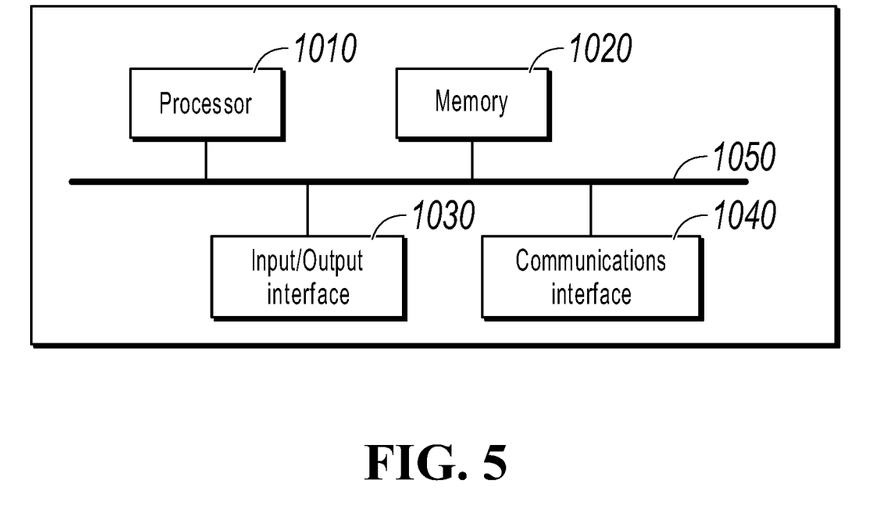
FIG. 5 is a schematic structural diagram illustrating a device used to configure the method in an implementation of the present specification.

FIG. 5 is a schematic structural diagram illustrating a more specific hardware structure of a computing device, according to an implementation of the present specification. The device may include a processor 1010, a memory 1020, an input/output interface 1030, a communications interface 1040, and a bus 1050. A communication connection between the processor 1010, the memory 1020, the input/output interface 1030, and the communications interface 1040 is implemented inside the device by using the bus 1050.

The processor 1010 may be implemented by using a common central processing unit (CPU), a microprocessor, an application specific integrated circuit (ASIC), one or more integrated circuits, etc., and is configured to execute a related program, to implement the technical solutions provided in the implementations of the present specification.

The memory 1020 may be implemented in a form of a read-only memory (ROM), a random access memory (RAM), a static storage device, a dynamic storage device, etc. The memory 1020 may store an operating system and another application program. When the technical solutions provided in the implementations of the present specification are implemented by using software or firmware, related program code is stored in the memory 1020, and is invoked and executed by the processor 1010.

The input/output interface 1030 is configured to connect to the input/output module to input and output information. The input output/module (not shown in the figure) may be configured as a component in the device, or may be externally connected to the device to provide corresponding functions. The input device may include a keyboard, a mouse, a touchscreen, a microphone, various sensors, etc. The output device may include a display, a speaker, a vibrator, an indicator, etc.

The communications interface 1040 is configured to connect to a communications module (not shown in the figure), so as to implement communication and interaction between the device and another device. The communications module may implement communication in a wired method (for example, a USB or a network cable), or may implement communication in a wireless method (for example, a mobile network, WiFi, or Bluetooth).

The bus 1050 includes a channel for transmitting information between components (for example, the processor 1010, the memory 1020, the input/output interface 1030, and the communications interface 1040) of the device.

It is worthwhile to note that though the previous device shows only the processor 1010, the memory 1020, the input/output interface 1030, the communications interface 1040, and the bus 1050, in a specific implementation process, the device may further include another component required to implement normal operation. In addition, a person skilled in the art may understand that the previous device may include only components required to implement the solutions in the implementations of the present specification, and does not need to include all the components shown in the figure.

An implementation of the present specification further provides a computer readable storage medium. The computer readable storage medium stores a computer program, and when a processor executes the program, the user account creation method shown in FIG. 3 is implemented.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc ready-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, a device implementation is similar to a method implementation, and therefore is described briefly. For a related part, references can be made to some descriptions in the method implementation. The previously described method implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented method for storing data of a new user account in a blockchain ledger, the method comprising:

receiving, from a first client, by a server storing data in the blockchain ledger, an operation instruction instructing the server to create a user account corresponding to a user identifier, wherein the operation instruction comprises the user identifier and a public key parameter;

obtaining, based on the public key parameter, a public key corresponding to the user identifier;

creating, in the blockchain ledger, the user account corresponding to the user identifier;

generating a data record comprising the operation instruction and the public key;

writing the data record into the blockchain ledger;

determining position information of the data record in the blockchain ledger, wherein the position information comprises a block height of a data block where the data record is located and an offset of the data record in the data block; and writing the public key, the position information, and the user identifier to an index, wherein the public key, the position information, and the user identifier are associated with one another in the index, and wherein the public key is used as a primary key of the index.

2. The computer-implemented method of claim 1, wherein obtaining the public key corresponding to the user identifier comprises:

obtaining the public key from a pre-stored public key information table; or invoking a key generation algorithm to generate a public-private key pair, obtaining the public key from the public-private key pair, and sending a private key from the public-private key pair to a service end corresponding to the user identifier.

3. The computer-implemented method of claim 1, further comprising:

establishing a mapping relationship between the user identifier and the public key; and writing the mapping relationship into a user configuration file corresponding to the blockchain ledger.

4. The computer-implemented method of claim 1, further comprising:

receiving, from a second client, a request to obtain the public key, wherein the request comprises the user identifier; and querying the index to obtain the public key corresponding to the user identifier; or querying the index to obtain the position information, querying the blockchain ledger to obtain the data record corresponding to the position information, and obtaining the public key from the data record.

5. The computer-implemented method of claim 1, further comprising generating a new data block in the blockchain ledger, wherein generating the new data block in the blockchain ledger comprises:

receiving one or more further data records, and determining a hash value of each further data record;

determining that a predetermined block forming condition is satisfied;

determining that a sequence number of the new data block in the blockchain ledger is greater than 1; and generating the new data block in the blockchain ledger, the new data block comprising a hash value of the new data block, a block height of the new data block, the one or more further data records, and a block forming time, wherein the hash value of the new data block is determined based on the hash values of the one or more further data records and a hash value of an adjacent previous block in the blockchain ledger, and wherein the block height of the new data block is greater than respective block heights of previous data blocks in the blockchain ledger.

6. A non-transitory, computer-readable medium storing one or more instructions executable by a computer system to perform operations comprising:

receiving, from a first client, by a server storing data in a blockchain ledger, an operation instruction instructing the server to create a user account corresponding to a user identifier, wherein the operation instruction comprises the user identifier and a public key parameter;

obtaining, based on the public key parameter, a public key corresponding to the user identifier;

creating, in the blockchain ledger, the user account corresponding to the user identifier;

generating a data record comprising the operation instruction and the public key;

writing the data record into the blockchain ledger;

determining position information of the data record in the blockchain ledger, wherein the position information comprises a block height of a data block where the data record is located and an offset of the data record in the data block; and writing the public key, the position information, and the user identifier to an index, wherein the public key, the position information, and the user identifier are associated with one another in the index, and wherein the public key is used as a primary key of the index.

7. The computer-readable medium of claim 6, wherein obtaining the public key corresponding to the user identifier comprises:

obtaining the public key from a pre-stored public key information table; or invoking a key generation algorithm to generate a public-private key pair, obtaining the public key from the public-private key pair, and sending a private key from the public-private key pair to a service end corresponding to the user identifier.

8. The computer-readable medium of claim 6, wherein the operations further comprise:

establishing a mapping relationship between the user identifier and the public key; and writing the mapping relationship into a user configuration file corresponding to the blockchain ledger.

9. The computer-readable medium of claim 6, wherein the operations further comprise:

receiving, from a second client, a request to obtain the public key, wherein the request comprises the user identifier; and querying the index to obtain the public key corresponding to the user identifier; or querying the public key index table to obtain the position information, querying the blockchain ledger to obtain the data record corresponding to the position information, and obtaining the public key from the data record.

10. The computer-readable medium of claim 6, wherein the operations further comprise generating a new data block in the blockchain ledger, wherein generating the new data block in the blockchain ledger comprises:

receiving one or more further data records, and determining a hash value of each further data record;

determining that a predetermined block forming condition is satisfied;

determining that a sequence number of the new data block in the blockchain ledger is greater than 1; and generating the new data block in the blockchain ledger, the new data block comprising a hash value of the new data block, a block height of the new data block, the one or more further data records, and a block forming time, wherein the hash value of the new data block is determined based on the hash values of the one or more further data records and a hash value of an adjacent previous block in the blockchain ledger, and wherein the block height of the new data block is greater than respective block heights of previous data blocks in the blockchain ledger.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  receiving, from a first client, by a server storing data in a blockchain ledger, an operation instruction instructing the server to create a user account corresponding to a user identifier, wherein the operation instruction comprises the user identifier and a public key parameter;
  obtaining, based on the public key parameter, a public key corresponding to the user identifier;
  creating, in the blockchain ledger, the user account corresponding to the user identifier;
  generating a data record comprising the operation instruction and the public key;
  writing the data record into the blockchain ledger;
  determining position information of the data record in the blockchain ledger, wherein the position information comprises a block height of a data block where the data record is located and an offset of the data record in the data block; and
  writing the public key, the position information, and the user identifier to an index, wherein the public key, the position information, and the user identifier are associated with one another in the index, and wherein the public key is used as a primary key of the index.

12. The computer-implemented system of claim 11, wherein obtaining the public key corresponding to the user identifier comprises:
  obtaining the public key from a pre-stored public key information table; or
  invoking a key generation algorithm to generate a public-private key pair, obtaining the public key from the public-private key pair, and sending a private key from the public-private key pair to a service end corresponding to the user identifier.

13. The computer-implemented system of claim 11, wherein the operations further comprise:
  establishing a mapping relationship between the user identifier and the public key; and
  writing the mapping relationship into a user configuration file corresponding to the blockchain ledger.

14. The computer-implemented system of claim 11, wherein the operations further comprise:
  receiving, from a second client, a request to obtain the public key, wherein the request comprises the user identifier; and
  querying the index to obtain the public key corresponding to the user identifier; or
  querying the public key index table to obtain the position information, querying the blockchain ledger to obtain the data record corresponding to the position information, and obtaining the public key from the data record.

15. The computer-implemented system of claim 11, wherein the operations further comprise generating a new data block in the blockchain ledger, wherein generating the new data block in the blockchain ledger comprises:
  receiving one or more further data records, and determining a hash value of each further data record;
  determining that a predetermined block forming condition is satisfied;
  determining that a sequence number of the new data block in the blockchain ledger is greater than 1; and
  generating the new data block in the blockchain ledger, the new data block comprising a hash value of the new data block, a block height of the new data block, the one or more further data records, and a block forming time,
    wherein the hash value of the new data block is determined based on the hash values of the one or more further data records and a hash value of an adjacent previous block in the blockchain ledger, and
    wherein the block height of the new data block is greater than respective block heights of previous data blocks in the blockchain ledger.

* * * * *